(12) United States Patent
Kunin et al.

(10) Patent No.: US 6,340,712 B1
(45) Date of Patent: Jan. 22, 2002

(54) NON-CHLORIDE CONTAINING REGENERANT COMPOSITION FOR A STRONG ACID CATION EXCHANGE RESIN OF A WATER SOFTENER

(75) Inventors: Robert Kunin, Trenton, NJ (US); Peter A. Yarnell, Sellersville, PA (US); Nichole L. Pennisi, Newark, DE (US)

(73) Assignee: Graver Technologies, Inc., Glasgow, DE (US)

( * ) Notice: Subject to any disclaimer, the term of this patent is extended or adjusted under 35 U.S.C. 154(b) by 0 days.

(21) Appl. No.: 09/501,694

(22) Filed: Feb. 10, 2000

(51) Int. Cl.$^7$ .................................................. C08F 8/42
(52) U.S. Cl. ..................... 521/26; 210/670; 210/674; 252/192
(58) Field of Search ........................... 521/26; 252/192; 210/670, 674

(56) References Cited

U.S. PATENT DOCUMENTS

| 2,769,787 A | 11/1956 | Diamond |
| 3,918,906 A | * 11/1975 | Small |
| 4,071,446 A | 1/1978 | Kunin |
| 4,116,860 A | 9/1978 | Kunin |
| 4,540,715 A | 9/1985 | Waati et al. |
| 4,664,811 A | 5/1987 | Operhofer |
| 4,839,086 A | 6/1989 | Zaid |
| 5,239,285 A | 8/1993 | Rak |
| 5,362,460 A | * 11/1994 | Laird ....................... 423/157.4 |
| 5,363,087 A | 11/1994 | Johannsen et al. |
| 5,665,783 A | 9/1997 | Katzakian, Jr. et al. |
| 6,001,974 A | * 12/1999 | Demmer ..................... 530/364 |

FOREIGN PATENT DOCUMENTS

JP 60-255147 12/1985

* cited by examiner

*Primary Examiner*—Fred Zitomer
(74) *Attorney, Agent, or Firm*—Rockey, Milnamow & Katz Ltd.

(57) ABSTRACT

Non-chloride containing regenerant compositions of potassium acetate or potassium formate, at least one surfactant and at least one chelating agent as well as methods for efficient regeneration of water softeners utilizing the regenerant compositions are disclosed. A preferred regenerant composition is a solution of potassium acetate or potassium formate with citric acid and octyl phenol ethoxylate.

8 Claims, 1 Drawing Sheet

NON-CHLORIDE CONTAINING REGENERANT COMPOSITION FOR A STRONG ACID CATION EXCHANGE RESIN OF A WATER SOFTENER

FIELD OF THE INVENTION

This invention is directed generally to non-chloride containing regenerant compositions of potassium acetate, at least one surfactant and at least one chelating agent as well as methods for efficient regeneration of water softeners utilizing the regenerant compositions are disclosed. A preferred regenerant composition is a solution of potassium acetate, citric acid and octyl phenol ethoxylate.

BACKGROUND OF THE INVENTION

Hard water contains certain minerals, such as calcium and magnesium, which can be detrimental to a water system. In particular, these minerals will form an undesirable precipitate when they come in contact with soap, and will scale in piping, water heaters, pots, and washing machines. To alleviate this problem, water softening systems have become quite popular. Such systems convert hard water to soft water by removing minerals (mainly magnesium and calcium) from the hard water. This is done by a process known as cation exchange. In this process, sodium or other cations are substituted for calcium and magnesium ions in the hard water.

The process basically involves running hard water through an exchange media, such as an organic resin bed or zeolite softener regenerated with exchangeable cations, such as sodium ions or potassium ions. These ions are attached to the beads due to an inherent negative charge in the beads. A brine, consisting of sodium chloride or potassium chloride dissolved in water, is run over the beads for regeneration. Once the beads are regenerated, the system is ready to operate by running hard water through the beads. Cation exchange thus takes place, and the resultant effluent water is soft.

Eventually, the sodium or potassium ions carried by the beads will be depleted, or virtually depleted. The beads will then need to be regenerated with sodium or potassium. The regeneration process is the same as the initial charging process in that brine passes over the beads. However, during regeneration, any effluent brine will contain magnesium, calcium, and sodium chloride or potassium chloride, as is well known in the art.

The effluent liquid from the regeneration process will have a relatively high concentration of NaCl and KCl as high as 5–10%. Other elements, such as manganese, iron, sodium, magnesium, and potassium, either naturally existing in the water or collected as a result of water softening, contribute to the TDS of the effluent waste water, as well as the alkali chlorides.

The high TDS effluent is then sent through a drain to the sewer system as any drain water from a house. Due to recent environmental concerns and the desire for water reclamation, many municipalities are enacting or considering ordinances limiting the amount of chlorides and/or TDS that can be sent through sewer systems. These limits often are on the order of 250 ppm chlorides and 500 ppm TDS. Since effluent in the regeneration process far exceeds these maximum acceptable amounts, water softeners have been banned by some municipalities.

To meet the new stricter requirements, the residential softener can be regularly changed out to remove the undesirable products without flushing them into the sewer system. Such change outs typically involve service personnel periodically traveling to the houses or offices having water softeners, removing the tanks with the exhausted beads. The tanks of beads are taken to a facility for a centralized regeneration process. Once regenerated, these tanks of beads can again be used to replace tanks with exhausted beads.

Therefore, there is a need for an alternative method which allows efficient regeneration without release of chloride by-products to a sewer system.

It is an object of this invention to provide a composition and a method for regenerating water softeners without releasing chlorides.

It is a further object of this invention to provide an efficient method which allows accurate metering of the necessary amount of regenerating solution for most efficient regeneration of water softeners.

BRIEF SUMMARY OF THE INVENTION

The invention is directed to a non-chloride containing regenerant composition for regenerating a strong acid cation exchange resin consisting essentially of:

from about 5 to about 60 weight percent of at least one of potassium salt selected from the group consisting of potassium acetate and potassium formate;

from about 0.0005 to about 0.1 weight percent of at least one surfactant;

from about 0.01 to about 1 weight percent of at least one chelating or sequestering agent; and the balance water.

The invention is also directed to a method for regenerating a spent strong acid cation exchange resin without release of chloride comprising the step of contacting said resin with a regenerating amount of a solution of from about 5 to about 60 weight percent of at least one potassium salt selected from the group consisting of potassium acetate and potassium formate;

from about 0.0005 to about 0.1 weight percent of at least one surfactant;

from about 0.01 to about 1 weight percent of at least one chelating or sequestering agent;

and the balance water.

The invention is also directed to a method for treating a spent strong acid cation exchange resin to regenerate said resin comprising the steps of:

diluting a concentrated solution of at least one potassium salt selected from the group consisting of potassium acetate and potassium formate, at least one surfactant and at least one chelating or sequestering agent to form a dilute solution of from about 5 to about 60 weight percent potassium acetate; from about 0.0005 to about 0.1 weight percent of at least one surfactant; from about 0.01 to about 1 weight percent of at least one chelating agent; and the balance water; and then passing said solution through a bed said resin.

For the practice of any aspect of this invention, the potassium salt may be potassium acetate and the amount of potassium acetate may be from about 10 to about 25 weight percent, and more preferably from about 10 to about 15 weight percent. A presently preferred surfactant is octyl phenol ethoxylate and a presently preferred chelating or sequestering agent is citric acid.

DETAILED DESCRIPTION OF THE INVENTION

The Regenerant

Figure 1:
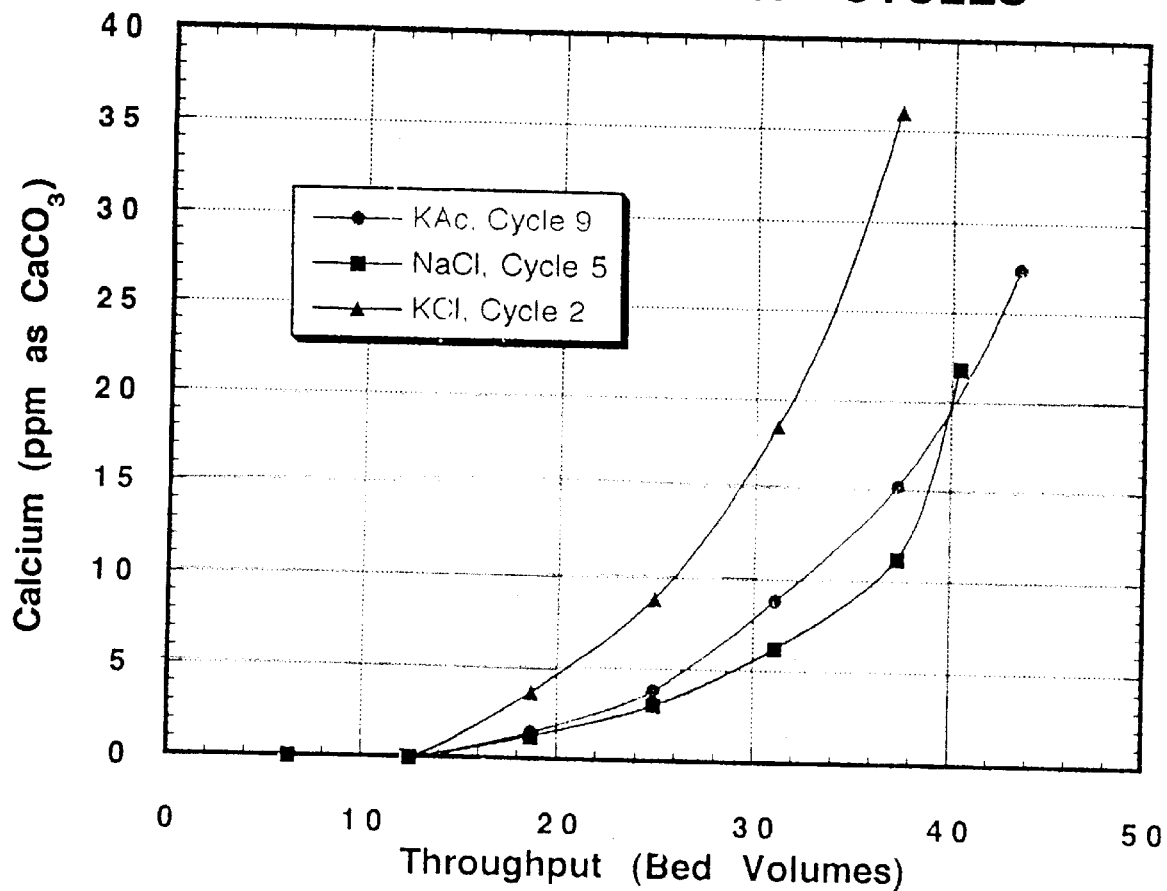
FIG. 1 is a graph of the service cycle (following counter current regeneration) comparison of selected median cycles.

NaCl is conventionally used as a regenerant for residential water softeners. KCl has been disclosed as a regenerant in U.S. Pat. Nos. 4,116,860 and 4,071,446. Alkali metal acetates were disclosed as poor regenerants of weak cationic exchange resins in U.S. Pat. No. 5,665,783. Potassium salts as regenerants were disclosed in JP 60-255147. In the Japanese reference potassium acetate in tablet or granular form is mentioned, but potassium chloride is described as being ideal.

Traditionally, regenerants for residential water softeners are purchased in bulk (40 or 50 pound bags) as solids granules. Periodically, the owner/operator of the softener adds these granules to water in the brine tank of the softener in sufficient quantity to form a saturated brine solution. This solution, in turn, is diluted to the desired concentration in the softener prior to flowing through the bed of cation exchange resin at the time of regeneration.

In the present invention, a liquid solution of either potassium acetate or potassium formate is utilized to regenerate the strongly acidic cation resin. Although current softening equipment must be modified to accommodate proper dilution of liquid regenerants, the basic regeneration process remains unchanged when liquid regenerants are used in these units. Virtually all other ion exchange resin applications use liquid regenerants for regenerations. Both potassium acetate and potassium formate are highly soluble in water over a wide range of temperatures. Moreover, trace additives such as citric acid and surfactant also readily dissolve in the potassium acetate or potassium formate solution. This ready solubility allows thorough and homogeneous mixing of the three components in the "cocktail" regenerant. The incorporation of trace components provides ongoing preventative action to eliminate or limit fouling of the softening resin.

The Surfactants

The surfactants must be anionic as non-ionic, or cationic surfactants would bind to the resin exchange sites. The candidate surfactants must be safe for human consumption at low levels in drinking water, as minute quantities of the regenerating composition might be carried into the treated water supply. The surfactant should be low foaming at the normal level of use, to prevent the introduction of air into the softener. The surfactant should be soluble in saturated brine (not all surfactants are). It should be compatible with hard water, so no insoluble precipitates are formed. Finally, the surfactant should be economically justifiable. A preferred surfactant is octyl phenol ethoxylate.

The Chelating or Sequestering Agents

Citric acid, in combination with a salt of citric acid, and an anti-caking agent has been disclosed as a regenerative composition for industrial or household water softeners in U.S. Pat. No. 4,839,086. A solution of sodium chloride and citric acid was disclosed as a regenerant for a spent resinous sulfonated copolymer of styrene and divinylbenzene in residential water softeners in U.S. Pat. No. 2,769,787. A regenerant composition for industrial ion exchange resins which includes a surfactant and a sequestering agent such as citric acid is disclosed in U.S. Pat. No. 4,664,811, and a composition for regenerating cation exchange resins including an alkylated diphenyl oxide disulfonate surfactant, an alkali metal citrate and sodium chloride are disclosed in U.S. Pat. No. 4,540,715. However the combination of potassium acetate with a surfactant and a chelating or sequestering agent is not disclosed by the above-mentioned references.

A preferred chelating or sequestering agent is citric acid. Other sequestering agents are represented by aminocarboxylic acid derivatives such as ethylene diamine tetra acetic acid (EDTA). Other amino carboxylic acid chelating agents are alkylene polyamines which have been in whole or in part reacted to provide pendant carboxylic acid groups from the nitrogen atoms contained in these compounds. Another class of chelating agents is amino phosphonates. Other chelating agents include carboxylate materials such as citric acid and gluconic acid among others.

The Method

A particular problem associated with conventional tablets or granular regenerants is the difficulty in determining when the supply of solid material is depleted. U.S. Pat. Nos. 5,239,285 and 5,363,087 disclose techniques for sensing a low level of reserve solid regenerant. The present invention provides an alternative to these conventional methods.

All regenerations on residential softener resins ultimately utilize liquid regenerants. Unlike conventional brine regenerants, the potassium acetate or potassium formate regenerants would be sold, transported and charged to the softener in the liquid form. Containers similar to those commonly sold with liquid detergents would suffice for these activities. Although existing softeners require minor modifications to accommodate liquid regenerants, the regeneration process within the softener is entirely analogous to conventional operation. The amount of liquid regenerant used in each regeneration depends on the level of hardness in the water to be treated, the usage of the softened water, and the desired interval between regenerations. Again, these are the same parameters and dependence factors associated with conventional regenerants. Service cycles following regeneration with liquid regenerants are comparable in length to those obtained with conventional regenerants. Other constituents could be added to the liquid regenerant mixture as long as they are soluble in a high TDS water and do not interact with existing trace components or the potassium acetate/potassium formate regenerant to form precipitates.

Potassium acetate and potassium formate can be added to the brine tank of a water softener in a solid, granular form. Because of their high solubility, they actually will dissolve much more readily than potassium chloride when used in this way. However, granulation or pelletization of potassium acetate will add expense to the regenerant since this compound is made as a liquid. Most importantly, liquid regenerants allow insertion of trace compounds such as the citric acid and the surfactant to form a homogeneous mixture prior to addition to the brine tank. Solid granules or pellets offer no comparable opportunity since trace components added in either solid or liquid form are not subject to thorough mixing in the brine tank during dilution. Consequently, these trace additives are charged only periodically after a problem such as iron fouling is detected. Conversely, the ongoing, routine inclusion of trace components provides protection against development of fouling problems. More specifically, the preferred citric acid acts to sequester iron present in the hard water that potentially fouls the cation exchange resin sites. Similarly, the preferred surfactant acts to retain oils or grease present from upstream pumps. Oils and grease readily foul ion exchange resins.

The regenerant composition may also contain other additives such as reducing agents. The reducing agents may be selected from a wide variety of chemicals. They include, but are not limited to such reducing agents as ascorbic and erythorbic acids, hydrosulfites, oxalic acid, sodium oxalate, hydroquinones or reducing sugars such as D-glucose, catechol and tannin or tannic acid. For the treatment of potable water, the reducing agent should be non-toxic. A preferred reducing agent is erythorbic acid, ascorbic acid or water-soluble salts thereof.

The regenerant compositions and method for regeneration of the present invention are described in detail hereinafter in the Examples. These Examples are presented to describe preferred embodiments and utilities of the invention and are not meant to limit the invention unless otherwise stated in the claims appended hereto.

EXAMPLE 1

Co-current regeneration capabilities of potassium chloride, sodium chloride and potassium acetate were tested in the following manner. The work was performed in glass columns with the dimensions of 1.0 inch (25 mm) inner diameter and 48.0 inches in length. These columns were fitted with retaining screens and plastic endcaps for ion exchange resin retention during operation. Positive displacement pumps with continuously variable speed controls were used to deliver solution to the column from the appropriate reservoir. Solutions needed for the exhaustion, rinse, and regeneration operations were made up and stored in plastic carboys of either 20 or 50 liter capacity. Ultra-pure water generated by multiple unit process (reverse osmosis, ion exchange and adsorption) equipment was used in all dilutions and rinses, as well as in subsequent analytical work.

A gellular strongly acidic cation resin in the sodium form made by Rohm and Haas Company was the water softening resin utilized. No preconditioning was done prior to charging the resin to the column. Since two feet is usually considered a minimum bed depth for laboratory trials of this type, a minimum of 315–325 wet milliliters of cation resin was needed. Generally, extra resin was charged to the column and the excess volume was removed via backwashing. This process removed the finest particles, classified the bed, and resulted in a 25 inch bed height after backwashing, settling, and draining. Once charged, the resin was rinsed with ultra-pure water at a flow rate of 350–360 mls/min (<1 bed volume (BV)/min) prior to use.

Calcium chloride was chosen as the dissolved solids for the challenge solution for the potassium acetate trials. A concentration of 1000 ppm calcium as $CaCO_3$ was used for all exhaustions. The calcium solution was made up in a 50 liter carboy using calcium chloride dihydrate and ultra-pure water. The calcium solution was pumped to the column at a rate of 215–225 mls/min (ca. 0.67 BV/min). With this rapid flow rate, exhaustion took only a little over 1.5 hours. Samples of the effluent solution were taken periodically during exhaustion and subsequently titrated for hardness (calcium) using a standard ASTM method. This method utilizes a solution of 0.01N ethylene diamine tetraacetate (EDTA), made up from the disodium salt dihydrate, with 7% by volume ethyl alcohol solvent. A mixture of ammonium chloride and ammonium hydroxide was used to buffer the EDTA solution to moderately high pH to enhance the clarity of the endpoint during titration. The indicator for this titration was Erichrome Black T prepared in a mixture of triethanolamine and ethyl alcohol. The exhaustion was terminated when the hardness (calcium) leakage increased to 20 ppm as $CaCO_3$ (2% of the influent). This required 18–20 liters of the calcium chloride solution. The resin bed was subsequently rinsed with 10 liters of ultra-pure water at 220 mls/min to displace residual calcium chloride.

Water softeners are commonly regenerated with a 10% brine (sodium chloride) solution. Consequently, 10% (by weight) potassium acetate regenerant was used. The solution was made up by dissolving reagent grade potassium acetate granules in ultra-pure water in a 20 liter carboy. The potassium acetate solution was pumped through the resin bed at 5–52 mls/min (9–10 BV/hr). A total regenerant dosage of 60 lbs/ft$^3$ was applied to the bed. Following the regeneration, the slow rinse (4 BV total) utilized the same flow rate. Samples of the effluent solutions were taken every 5 minutes initially during regeneration and rinse. Subsequently these fractions were titrated for hardness (calcium) leakage as above.

The regenerated and rinsed resin was again exhausted with the 1000 ppm $CaCl_2$ as $CaCO_3$ solution and rinsed as before. This time, the exhausted column was regenerated with 10% potassium acetate at a dosage level of 10 lbs/ft$^3$ and rinsed. The flow rate was reduced to 8.5 mls/min (ca. 1.5 BV/hr) to allow one hour of contact time during regeneration. A slow rinse of the same flow rate followed. Leakage data were collected as before. Then, the process was repeated again except that the regeneration level was further reduced to 5–5.5 lbs/ft$^3$ and the flow rate was again reduced to 4 mls/min (0.5 BV/hr). Since calcium elution was incomplete after one hour of slow rinse, the flow rate was subsequently increased to 50 mls/min for 40 minutes of fast rinse.

NaCl and KCl were evaluated in a similar manner. The results for all three regenerants are presented in Table 1. The potassium acetate regenerant used in these experiments did not include either a sequestering agent or a surfactant as trace additive(s). The same was true for the control experiments with sodium chloride and potassium chloride regenerants. It is unlikely that similar experiments incorporating the trace components would generate different results since the synthetic feed water used contained no iron, oil or grease.

Table 1 summarizes the elution of hardness ions as a function of regenerant (KAc, NaCl, KCl) and throughput for the regeneration and rinse steps. In this example, the regeneration dosage is 60 lbs/ft$^3$. For all three elutions, hardness concentration peaks between 1.0 and 1.5 bed volumes. The peak hardness concentrations are nearly identical for the potassium acetate and sodium chloride regenerants and somewhat lower for the potassium chloride. Hardness elution persists beyond 8 bed volumes of throughput in each case. Overall, the three elution curves are very similar and thereby indicative of equivalent performance from all three regenerants.

TABLE 1

Co-current Regeneration Elution Comparison

| Regenerant | Hardness (ppm as $CaCO_3$) | Through put (Bed Volumes) |
|---|---|---|
| KCl | 2000.000 | 0.78000 |
| KCl | 24000.00 | 1.5500 |
| KCl | 15000.000 | 2.3300 |
| KCl | 11000.000 | 3.1100 |
| KCl | 8500.000 | 3.8800 |
| KCl | 5400.000 | 4.6600 |

TABLE 1-continued

Co-current Regeneration Elution Comparison

| Regenerant | Hardness (ppm as CaCO$_3$) | Through put (Bed Volumes) |
|---|---|---|
| KCl | 3900.000 | 5.4300 |
| KCl | 2900.000 | 6.2100 |
| KCl | 2300.000 | 6.9900 |
| KCl | 2000.000 | 7.7600 |
| KCl | 1800.000 | 8.5400 |
| KCl | 1300.000 | 9.6200 |
| KCl | 1100.000 | 10.090 |
| KCl | 80.000 | 10.870 |
| KCl | 20.000 | 11.650 |
| KCl | 10.000 | 12.420 |
| KCl | 4.000 | 13.200 |
| KCl | 0.000 | 13.980 |
| NaCl | 0.000 | 0.159 |
| NaCl | 0.000 | 0.3175 |
| NaCl | 5.000 | 0.524 |
| NaCl | 1700.000 | 0.635 |
| NaCl | 12100.000 | 0.794 |
| NaCl | 29800.000 | 0.952 |
| NaCl | 32300.000 | 1.11 |
| NaCl | 29800.000 | 1.27 |
| NaCl | 26700.000 | 1.43 |
| NaCl | 22400.000 | 1.59 |
| NaCl | 20400.000 | 1.75 |
| NaCl | 20000.000 | 1.9 |
| NaCl | 18000.000 | 2.06 |
| NaCl | 17200.000 | 2.22 |
| NaCl | 15200.000 | 2.38 |
| NaCl | 13700.000 | 2.54 |
| NaCl | 12100.000 | 2.86 |
| NaCl | 9900.000 | 3.17 |
| NaCl | 9000.000 | 3.49 |
| NaCl | 7600.000 | 3.81 |
| NaCl | 5200.000 | 4.92 |
| NaCl | 3700.000 | 5.4 |
| NaCl | 3100.000 | 6.19 |
| NaCl | 2300.000 | 6.98 |
| NaCl | 1100.000 | 8.57 |
| KAc | 0.000 | 0.155 |
| KAc | 0.000 | 0.31 |
| KAc | 0.000 | 0.464 |
| KAc | 349.000 | 0.619 |
| KAc | 7900.000 | 0.774 |
| KAc | 19000.000 | 0.929 |
| KAc | 24600.000 | 1.08 |
| KAc | 26300.000 | 1.24 |
| KAc | 28300.000 | 1.39 |
| KAc | 31500.000 | 1.55 |
| KAc | 29900.000 | 1.7 |
| KAc | 28300.000 | 1.86 |
| KAc | 21200.000 | 2.01 |
| KAc | 20000.000 | 2.17 |
| KAc | 17400.000 | 2.32 |
| KAc | 16000.000 | 2.48 |
| KAc | 12100.000 | 2.79 |
| KAc | 10300.000 | 3.1 |
| KAc | 8400.000 | 3.41 |
| KAc | 6700.000 | 3.72 |
| KAc | 3900.000 | 4.8 |
| KAc | 3100.000 | 5.26 |
| KAc | 2300.000 | 6.19 |
| KAc | 1100.000 | 7.74 |

EXAMPLE 2

Counter-current regeneration capabilities of sodium chloride, potassium chloride and potassium acetate were compared in the following manner. The equipment described in Example 1 was utilized with the following modifications.

In order to maintain the requisite packed bed during upflow operations through the resin bed, a fine mesh (ca. 60 mesh) plastic screen was cut and fitted into the glass column. This screen was carefully lowered into place directly on the top of the settled resin bed. The headspace above the screen was then filled with 5 mm glass beads. The beads were intended to prevent unwanted expansion of the resin bed and to provide additional flow distribution during downflow operations. Once the column was completely charged with resin, screen, and glass beads, the resin was thoroughly rinsed with ultra-pure water at a flow rate of 350–360 mls/min (<1 BV/min) prior to use.

The resin bed was subjected to repeated cycles consisting of exhaustion (service) with hardness, rinse, regeneration with a salt solution, and rinse. The exhaustions were done at a flow rate approximating the 6 gpm/ ft$^3$ maximum flow required from a home water softener. The same flow was used for the rinse after the exhaustion. All rinses utilized ultra-pure water. Liquid flow down through the column in both of these steps, as was done previously in co-current studies. The regenerations were done at flow rate of 0.1–0.15 gpm/ft$^3$ (ca/0.95 BV's/hr). Regenerant contact time was fixed at 52 minutes allowing the positive displacement pump to be set at a minimum sustainable value. Subsequent "slow" rinses were done at the same flow rate as the regeneration. After 1.5 bed volumes of slow rinse, the flow rate was increased to 1.2 gpm/ft$^3$ (ca. 9.4 BV's/hr) during the "fast" rinse. Flow during all regeneration and rinse steps was upward through the resin bed. Multiple cycles were run on each resin charge.

As in Example 1, calcium chloride was chosen as the dissolved solids for the challenge solution for all the countercurrent regeneration trials. The feed solution contained roughly 1000 ppm of calcium as calcium carbonate throughout these trials. The calcium solution was made up in a 50 liter carboy using calcium chloride dihydrate and ultra-pure water. The calcium solution was pumped to the column at a rate of 215–225 mls/min (ca. 40 BV/hr). With this rapid flow rate, exhaustion typically took less than an hour. Samples of the effluent solution were taken periodically during exhaustion and subsequently titrated for hardness (calcium) using a standard method as described in Example 1.

Water softeners are commonly regenerated with a 10% concentration brine (typically sodium chloride) solution. Consequently, 10% (by weight) concentration regenerant solutions were used. The regenerant solution was made up using reagent grade potassium acetate and ultra-pure water in a 20 liter carboy. A total regenerant dosage of 5.0 lbs/ft$^3$ was applied to the bed. During the regeneration and rinses, samples of the effluent solutions were taken every 5 minutes. Subsequently, these fractions were titrated for hardness (calcium) leakage as in Example 1.

The whole cycle of exhaustion, rinse, regeneration, slow rinse, and fast rinse was repeated until "equilibrium" performance was reached (typically 6–10 cycles). At this point, both exhaustion and regeneration behavior was reproducible from one cycle to the next.

In a parallel set of experiments performed sequentially, the same resin was tested using an identical protocol except for using first sodium chloride and then potassium chloride as control regenerants. In each case, a 10% (by weight) solution was made up from the corresponding salt.

Results of the comparative test are presented in Table 2 and FIG. 1. As with the co-current regeneration case in Example 1, the regenerants used in these experiments did not include either a sequestering agent or a surfactant as a trace additive(s). It is unlikely that similar experiments incorporating the trace components would generate different results since the synthetic feed water used contained no iron, oil or grease.

Table 2 summarizes the service or exhaustion cycle for each regenerant (KAc, NaCl, KCl) after countercurrent regeneration. Hardness leakage is plotted as a function of throughput. Initial leakage occurs in less than 20 bed volumes for each regenerant. Moreover, the 2% breakthrough used to terminate the service cycle occurs after roughly 40 bed volumes in each case. Overall, the three leakage curves are very similar and thereby indicative of equivalent performance for all three regenerants.

TABLE 2

Counter-current Regeneration Comparison of Selected Median Cycles

| Regenerant | $CaCl_2$ (L) | Time (min.) | Total Hardness ($Ca^{+2}$ as ppm $CaCO_3$) | Throughput (Bed Volumes) |
|---|---|---|---|---|
| NaCl | Feed | — | 1016 | — |
| NaCl | 2 | 9 | 0 | 6.2 |
| NaCl | 4 | 18 | 0 | 12.4 |
| NaCl | 6 | 27 | 1.2 | 18.6 |
| NaCl | 8 | 36 | 3 | 24.8 |
| NaCl | 10 | 45 | 6.2 | 31.1 |
| NaCl | 12 | 54 | 11.2 | 37.3 |
| NaCl | 13 | 58.5 | 21.8 | 40.4 |
| KCl | Feed | — | 1024 | — |
| KCl | 2 | 9 | 0 | 6.2 |
| KCl | 4 | 18 | 0 | 12.4 |
| KCl | 6 | 27 | 3.6 | 18.6 |
| KCl | 8 | 36 | 8.8 | 24.8 |
| KCl | 10 | 45 | 18.4 | 31.1 |
| KCl | 12 | 54 | 36 | 37.3 |
| KAc | Feed | — | 1016 | — |
| KAc | 2 | 9 | 0 | 6.2 |
| KAc | 4 | 18 | 0 | 12.4 |
| KAc | 6 | 27 | 1.4 | 18.6 |
| KAc | 8 | 36 | 3.8 | 24.8 |
| KAc | 10 | 45 | 8.8 | 31.1 |
| KAc | 12 | 54 | 15.2 | 37.3 |
| KAc | 14 | 63 | 27.4 | 43.5 |

EXAMPLE 3

The regenerant composition containing potassium acetate, surfactant and chelator was tested on a residential water softener system over a one year period with dosage at 6 lbs/ft$^3$. The water to be softened contained 105.4 ppm $Ca^{+2}$, 93.1 ppm $Mg^{+2}$, 18.5 ppm $Na^+$ and 3 ppm $K^+$; $Al^{+3}$, $Cu^{+2}$, $Fe^{+3}$, $Pb^{+2}$ and $Zn^{+2}$ were negligible; TDS=220 ppm as $CaCO_3$; and hardness=198.5 ppm, according to elemental analysis. During this time, 14 regeneration cycles were performed, and the regenerant continuously performed satisfactorily throughout all seasons and varying levels of usage.

EXAMPLE 4

To determine whether or not temperature would have any effect on the regenerants of the present invention, the procedure described in Example 1 was utilized to test potassium acetate solutions against the conventional NaCl treatment at ambient temperature and at cold (5–8° C.) temperature. The testing showed that the regenerative compositions of the present invention performed similarly to the conventional NaCl treatment at each temperature range.

EXAMPLE 5

The co-current regeneration experimental procedure described in Example 1 was utilized to test the regeneration capabilities of potassium formate. 10% (by weight) concentration potassium formate solutions were utilized. The regenerant solution was made using reagent grade potassium formate and ultra-pure water in a 20 liter carboy. A total regenerant dosage of 5.0 lbs/ft$^3$ was applied to the bed. During the regeneration and rinses, samples of the effluent solutions were taken every 5 minutes. Subsequently, these fractions were titrated for the hardness (calcium) leakage as above.

The initial regeneration and rinse cycles with potassium formate were successfully completed. As anticipated, hardness (calcium) loaded unto the strongly acidic cation resin was readily eluted from the bed. Table 3 illustrates the regeneration profile (calcium hardness eluted) as a function of throughput volume for the first cycle regeneration. After an induction period of less than one bed volume as the regenerant solution penetrates the bed, the calcium elution rapidly peaks at almost 25,000 ppm of Ca as $CaCO_3$ within 1.5 to 2.0 bed volumes, and the calcium elution is virtually complete within 3 bed volumes. The profile obtained from the data of Table 3 indicates that potassium formate functions as a regenerant for cation exchange resins.

TABLE 3

| THROUGHPUT (Bed Volume) | HARDNESS (ppm as $CaCO_3$) |
|---|---|
| 0.078 | 0 |
| 0.156 | 0 |
| 0.234 | 0 |
| 0.312 | 0 |
| 0.389 | 0 |
| 0.467 | 0 |
| 0.545 | 0 |
| 0.623 | 0 |
| 0.701 | 400 |
| 0.779 | 1180 |
| 0.857 | 2450 |
| 0.935 | 3840 |
| 1.012 | 6000 |
| 1.09 | 8100 |
| 1.168 | 9200 |
| 1.246 | 12720 |
| 1.324 | 15120 |
| 1.402 | 16840 |
| 1.48 | 18840 |
| 1.558 | 20160 |
| 1.636 | 23400 |
| 1.713 | 21800 |
| 1.791 | 19560 |
| 1.869 | 16320 |
| 1.947 | 11040 |
| 2.025 | 8200 |
| 2.103 | 4600 |
| 2.181 | 2760 |
| 2.259 | 2080 |
| 2.336 | 1440 |
| 3.115 | 76 |
| 3.894 | 0 |
| 4.673 | 0 |

All references cited are hereby incorporated.

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims.

We claim:

1. A method for regenerating a spent strong acid cation exchange resin without release of chloride comprising the step of contacting said resin with a regenerating amount of a solution of from about 5 to about 60 weight percent of at least one potassium salt selected from the group consisting of potassium acetate and potassium formate;

from about 0.0005 to about 0.1 weight percent of at least one surfactant;

from about 0.01 to about 1 weight percent of at least one sequestering agent; and the balance water.

2. The method of claim 1 wherein said potassium salt is potassium acetate and the amount of potassium acetate is from about 10 to about 25 weight percent.

3. The method of claim 2 wherein the amount of potassium acetate is from about 10 to about 15 weight percent.

4. The method of claim 1 wherein said surfactant is octyl phenol ethoxylate and said sequestering agent is citric acid.

5. A method for treating a spent strong acid cation exchange resin to regenerate said resin comprising the steps of:

diluting a concentrated solution of at least one potassium salt selected from the group consisting of potassium acetate and potassium formate, at least one surfactant and at least one sequestering agent to form a dilute solution of from about 5 to about 60 weight percent potassium acetate; from about 0.0005 to about 0.1 weight percent of at least one surfactant; from about 0.01 to about 1 weight percent of at least one sequestering agent, and the balance water; and then passing said solution through a bed of said resin.

6. The method of claim 5 wherein said potassium salt is potassium acetate and the amount of potassium acetate is from about 10 to about 25 weight percent.

7. The method of claim 6 wherein the amount of potassium acetate is from about 10 to about 15 weight percent.

8. The method of claim 5 wherein said surfactant is octyl phenol ethoxylate said sequestering agent is citric acid.

* * * * *